Figures 1, 2:
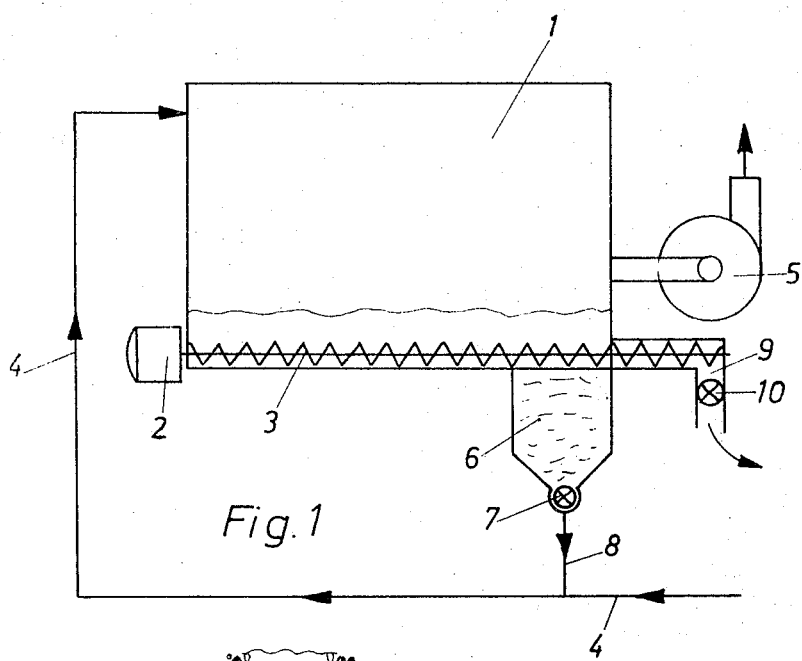

United States Patent [19]
Margraf

[11] 3,834,123
[45] Sept. 10, 1974

[54] DUST AND LIKE FILTERS METHOD

[76] Inventor: Adolf Margraf, 4961 Wendthagen am Haberkamp 196, Germany

[22] Filed: Mar. 1, 1972

[21] Appl. No.: 230,721

[30] Foreign Application Priority Data
Mar. 18, 1971 Germany............................ 2113062
Nov. 25, 1971 Germany............................ 2158461

[52] U.S. Cl............................ 55/96, 55/97, 55/338, 55/430
[51] Int. Cl............................................ B01d 46/04
[58] Field of Search......... 55/96, 97, 341, 262, 361, 55/338, 430; 210/193

[56] References Cited
UNITED STATES PATENTS
| | | | |
|---|---|---|---|
| 3,267,649 | 8/1966 | Vicard | 55/341 |
| 3,473,300 | 10/1969 | Wilm et al. | 55/302 |
| 3,480,330 | 11/1969 | Hirs et al. | 55/302 |
| 3,521,428 | 7/1970 | Dollinger et al. | 55/97 |
| 3,710,558 | 1/1973 | Feder | 55/338 |

FOREIGN PATENTS OR APPLICATIONS
252,688  6/1964  Australia................................ 55/97

*Primary Examiner*—Bernard Nozick
*Attorney, Agent, or Firm*—Karl F. Ross; Herbert Dubno

[57] ABSTRACT

This invention relates to filtering flue gases and other gases containing dust and similar dirty constituents of fine-particle size, utilizing a pocket filter, and wherein certain of the dust constituents are agglomerated. In accordance with the invention, a quantity of filtered dust is continuously circulated ahead of the filter and added to the gas to be cleaned. An accumulating amount of the dust is removed from the filter, which corresponds to the amount of fine dust contained in the dust-laden gas to be cleaned per unit of time. Preferably, the filtered dust that is re-circulated represents a multiple of the dust accumulating per unit of time and this multiple may be of the order of 2 to 100 times that amount.

2 Claims, 2 Drawing Figures

3,834,123

PATENTED SEP 10 1974

DUST AND LIKE FILTERS METHOD

The present invention relates to a method of filtering dust-laden or flue gases containing extremely small particles of dust or the like, in pocket or bag filters and to a pocket or bag filter for carrying out the method in which the filter surfaces are cleaned periodically by causing clean gas to flow counter to the dust-laden gas and if necessary in addition by shaking or vibrating the pockets or bags, the dust coming away from the filter surfaces being allowed to drop down into a lower dust collecting chamber.

The operation of known pocket or bag filters of the aforementioned type is satisfactory when dust-laden gases or flue gases, for example from smelting furnaces, electric furnaces, converters or the like, are to be cleaned, where the sizes of the dust particles are in the region of below $0.1 \mu m$, to $1 \mu m$, since then a thick or almost homogeneous layer of dust is deposited and clings to the filter surfaces by its high surface adhesion. This layer can not be removed either by clean gas flowing counter to the dust-laden gas or by pocket vibration to a satisfactory extent.

It has, therefore, previously been proposed in textile filters to bind the fine dust or primary dust before entrance of the dust-laden gas or flue gas into the filter, i.e., to bring the finest particles into mutual contact and to agglomerate them into coarser particles. To this end, it has been proposed to effect agglomeration by electrical charging which is very expensive or considerably to extend the gas pipe ahead of the filter in order thereby to increase the chances of causing the dust particles to come into contact. However, long pipe lines are too bulky and expensive. Agglomeration by means of ultra sonics has proved unreliable and requires too high an expenditure of energy.

It has, therefore, also been proposed to bind the finest dust particles and effect subsequent separation by means of a bag filter as shown in German Patent No. 896,753, by adding a coarser foreign dust to the dust-laden gas containing the fine dust, in order that the finest dust particles shall be deposited on the coarser dust, thereby making it easier to effect mechanical separation by means of the textile filter. FUrthermore, according to German published Specification No. 1,407,940, the dust-laden gas is caused to flow successively through a plurality of cyclones so that, firstly, the coarser dust particles are separated and then removed, while to the dust-laden gas ahead of the last cyclone in which the fine dust remaining in the gas stream is no longer to be separated, coarse dust from one of the front-connected cyclones is added in order to achieve agglomeration in the last cyclone. It has proved in practice that this cannot effect the finest dust, since the probability of contact between the finest dust and coarse dust is too slight so that such cyclones have had to be installed after the textile filters which leads to the aforementioned high flow resistances and failure of the filter.

It is an object of the invention to remove dust from dust-laden gases or flue gases having the finest dust particles (primary dust) of the order of $1 \mu m$ exclusively by means of pocket or bag filters without the operation of the filter bag being effected by an increase in the flow resistance.

The invention consists in a method of filtering gases containing extremely fine dust particles by means of a pocket filter, certain dust constituents being agglomerated, wherein a quantity of filtered dust is circulated continuously ahead of the filter and added to the gas to be cleaned and an accumulating amount of dust is removed from the filter which corresponds to the amount of fine dust contained in the dust-laden gas to be separated from the gas stream in the same unit of time.

To this end, the primary dust of the dust-laden or flue gas to be filtered is agglomerated in increasing fashion up to a maximum, being supplied several times, e.g., 2 to 100 times to the filter so that the probability of contact of the finest dust particles with the accumulated dust parts already agglomerated in the filter, in the pipe leading to the filter, in the dust-laden gas chamber of the filter and also on the filter surfaces themselves, is exceptionally high, agglomeration only continuing up to a predetermined maximum particle size which depends on the type of dust, since, if the agglomerated dust particles become too big, they de-agglomerate again by friction and enter the gas flow. In any event, agglomerated dust particles are continuously deposited on the filter surfaces which form to a certain extent a prefilter for the finest dust which also agglomerates on the filter surfaces with the coarser dust parts and is readily dislodged from the filter surfaces by clean gas or also by additional vibration, and drops down, as much agglomerated dust being removed constantly from the filter as the dust-laden or flue gas supplied per unit of time contains the finest amounts of dust while a multiple of this amount of dust remains in circulation.

At the beginning of the filter operation, e.g., while the filter surfaces are completely clean, the aforementioned multiple amount with respect to the amount of finest dust occurring in the dust-laden per unit of time is not yet present in agglomerated dust. The commencement of the filter operation can be initiated in different ways.

According to one operating method, at the beginning of filtering the amount of dust accumulating in the filter is re-circulated to the dust-laden gas to be cleaned in front of the filter together with the dust conveyed to the filter until, according to the type of the finest dust present, 2 to 100 times the amount of finest dust contained in the dust-laden gas per unit of time is reached, whereupon on maintaining the circulation, an amount of dust is removed which corresponds to the amount of finest dust contained per unit of time in the dust-laden gas to be cleaned.

According to a further method, at the beginning of filtering, a quantity of finest dust agglomerated from the finest dust of the dust-laden gas to be cleaned corresponding to 2 to 100 times the quantity of finest dust supplied per unit of time and contained in the dust-laden gas to be cleaned is supplied to the filter.

In another modification, at the beginning of filtering an amount of foreign dust binding with the finest dust of the dust-laden gas to be cleaned is fed to the filter which corresponds to 2 to 100 times the amount of finest dust which is contained in the dust-laden gas to be cleaned and supplied to the filter per unit of time.

The invention also consists in a pocket or bag filter for carrying out the method according to the invention, of the kind in which the filter surfaces are cleaned periodically by clean gas flowing counter to the dust-laden gas and, if necessary, in addition or exclusively, by vibrating the pockets and the dust dislodged from the filter surfaces then drops down into a lower dust collecting chamber, and wherein a receptacle is arranged in said dust collecting chamber beneath the delivery end of a worm conveyor, said receptacle receiving the accumulating dust dislodged from the filter surfaces, from which the dust is continuously circulated to the dust via a control means in a pipe discharging into the filter for the dust-laden gas to be cleaned, and wherein the dust accumulating in said receptacle in excess of the amount of dust to be circulated to said filter, which corresponds to the dust content of the dust-laden gas to be cleaned and added to the filter per unit of time, is removed from said dust collecting chamber by outlet means.

In so doing, it is possible to re-design conventional pocket or bag filters by certain additions thereto and modifications thereof, so that they may completely clean dust-laden or flue gases containing the finest gas particles.

In order that the invention may be more clearly understood, reference will now be made to the accompanying drawing, in which:

FIG. 1 is a diagram of a pocket filter incorporating the features of the invention, and FIG. 2 is a partial section through a filter or pocket or bag.

Referring now to the drawing, a conventional pocket filter, schematically shown at 1, is used for filtering dust-laden or flue gases containing fine dust (primary dust), and in which a chamber containing dust-laden gas, having parallel filter pockets to which dust-laden gas is conveyed so as to pass from the outside to the interior thereof, is separated by a slotted wall from a clean gas chamber. A collecting chamber for the dust dislodged from the filter surfaces by clean gas caused to flow counter to the dust-laden gas, and if necessary, by vibration of the pockets or bags, is located beneath the filter pockets or bags. A screw conveyor 3 driven by a motor 2 is positioned in this collecting chamber, as shown. The dust-laden gas, e.g., from a smelting furnace, electric furnace or the like, containing fine dust the particle size of which is of the order of a fraction of 1μm, is fed via a pipe 4 to the dust-laden gas chamber and the filtered clean gas is removed and blown out of the clean-gas chamber by means of a blower 5.

In accordance with the invention, a receptacle 6, open at the top, is attached to one end of a filter pocket below the end of the screw conveyor 3 to which receptacle the dust accumulating in the dust collecting chamber is supplied by means of the conveyor 3. This receptacle 6 is provided at its lower part with an outlet and a volume control means 7 determining the output of gas, and may be in the form of a bucket wheel charging valve. A predetermined amount of dust removed by means of the device 7 from the receptacle 6 is continuously re-circulated to the pipe 4 for example via a gravity pipe 8, as shown, or by a mechanical or pneumatic conveyor so that in the pipe 4, in the dust collecting chamber of the filter 1, and on the filter surfaces a (see FIG. 2) of the filter pockets, the finest primary dust of the dust-laden gas or flue gas to be filtered, is agglomerated together with the dust from the quantity of dust-laden gas constantly being removed from the receptacle 6. For operating the filter, it is necessary that an agglomerated amount of dust supplied to the receptacle which corresponds according to the type of finest dust to at least a multiple, e.g., 2 to 100 times, the amount of primary dust of the dust-laden gas to be filtered and supplied to the filter per unit of time.

This amount of agglomerated dust-laden gas accumulating in the dust-collecting chamber of the filter 1 and supplied through the screw 3 to the receptacle 6, can be achieved at the beginning of the filter operation in the manner hereinbefore mentioned and must constantly be separated by means of the filter bags together with the fine dust agglomerating with this other dust and be removed from the filter pockets so that, after dropping down through the screw 3, it again passes into the receptacle 6 and is again fed to the dust-laden gas in the pipe 4. The agglomerated dust is deposited on the surfaces a of the filter bags (FIG. 2) to a certain degree as a prefilter and also the finest primary dust particles agglomerate with the dust.

The screw conveyor 3 in the embodiment described extends outwardly beyond the receptacle 6 and ends above a removal point 9 provided with a bucket wheel 10 or the like. If the receptacle 6 has filled up with agglomerated dust and the aforementioned set amount of dust has been withdrawn therefrom constantly during the cycle, a quantity of dust corresponding to the quantity of primary dust of the dust-laden gas fed in per unit of time, is supplied automatically by means of the screw 3 to the removal point 9 and the bucket wheel 10 and removed from the filter.

In another method of operation, a quantity of dust which corresponds to the quantity of primary dust from the dust-laden gas introduced per unit of time, is removed from the upper part of the receptacle 6 by means of another screw conveyor or other removal means, however in the receptacle 6 the aforementioned multiple amount of agglomerated dust is constantly present and is removed in the cycle.

If the amount of primary dust in the gas to be cleaned per unit of time alters and becomes for example less, then automatically an appropriately quantity of dust is withdrawn from the filter automatically during the cycle, via the outlet means 9, 10.

In one particular apparatus set up to operate in accordance with the invention, 600,000 m³/hour of dust-laden gas to be cleaned were gathered from a smelting furnace. This gas contained 1g/m³ dust and consequently 600 kg of this fine dust were collected per hour. It has been shown in practice that for agglomerating the fine dust, a dust agglomerated up to 100 times the amount, i.e., 60 metric tons per hour, is removed from the dust-collecting chamber of the filter or dust-laden gas delivery pipe before the filter, for circulation in the cycle. On the other hand, 600 kg of dust were removed from the dust collecting chamber per hour by means of the screw conveyor 3 and the outlet means 9, 10.

Although the dust load of the furnace exhaust gases to be cleaned is essentially increased by feeding back the dust, normally very much multiplied, the filters in many cases can be smaller than hitherto because the behaviour of the difficult primary fine dust is advantageously altered upon separation by means of the new method.

I claim:

1. In a method of filtering a contaminated gas containing fine dust particles having a particle size up to about one micron by means of a pocket-type filter by passing the contaminated gas through the pocket-type filter, collecting the particles from said contaminated gas, and periodically releasing collected particles from the surface of the filter, the improvement which comprises recycling dust released from the filter surface, in a substantially constant amount of 2 to 100 times the amount of fine dust contained in a contaminated gas and entering the filter per unit time, to the contaminated gas immediately prior to passage thereof through the filter whereby both the recycled dust and the original dust in the contaminated gas are carried onto said surface; and discharging a portion of the released dust equal to the amount of fine dust contained in the contaminated gas and entering the filter per unit time.

2. The improvement defined in claim 1 wherein the dust is released from said filter at least inpart by passing a gas therethrough in a direction opposite to that in which said contaminated gas traverses the filter.

* * * * *